US006845700B2

(12) United States Patent
Capdeboscq

(10) Patent No.: US 6,845,700 B2
(45) Date of Patent: Jan. 25, 2005

(54) DEVICE FOR MOUNTING AND REMOVING DIE BLANKETS OF A ROTARY CUTTING ANVIL CYLINDER

(75) Inventor: Bernard Capdeboscq, Just-Chaleyssin (FR)

(73) Assignee: Martin (FR)

(*) Notice: Subject to any disclaimer, the term of this patent is extended or adjusted under 35 U.S.C. 154(b) by 6 days.

(21) Appl. No.: 10/127,056

(22) Filed: Apr. 18, 2002

(65) Prior Publication Data

US 2002/0166430 A1 Nov. 14, 2002

(30) Foreign Application Priority Data

Apr. 18, 2001 (FR) .......................................... 01 05222

(51) Int. Cl.[7] .............................. B26D 7/20; F16D 1/06

(52) U.S. Cl. ................................ 83/698.42; 29/895.23

(58) Field of Search ......................... 83/698.42, 698.41, 83/698.51, 698.61, 659; 29/895.23; 492/22, 48, 39, 45

(56) References Cited

U.S. PATENT DOCUMENTS 2,055,251 A * 3/1936 Duvall ..................... 492/22 X
3,110,255 A 11/1963 Jeschke et al. .......... 101/415.1
3,739,675 A 6/1973 Duckett et al. ............... 83/659
3,871,777 A * 3/1975 Sauer .................. 83/698.42 X
3,882,750 A 5/1975 Duckett et al. ............... 83/659
4,110,882 A * 9/1978 Hodge et al. ................. 492/48
4,157,067 A 6/1979 Dätwyler ................. 101/415.1
4,193,178 A * 3/1980 McArthur et al. ........ 492/48 X
4,378,737 A 4/1983 Kirkpatrick ............. 101/415.1
6,135,002 A * 10/2000 Neal ........................ 492/48 X
6,203,666 B1 * 3/2001 Hanaya .................... 492/48 X
6,435,069 B1 * 8/2002 Kirkpatrick, Jr. et al. ............................................................................. 83/698.42

FOREIGN PATENT DOCUMENTS

GB 1110078 4/1968
GB 1284695 8/1972

* cited by examiner

*Primary Examiner*—Charles Goodman
(74) *Attorney, Agent, or Firm*—Ostrolenk, Faber, Gerb & Soffen, LLP

(57) ABSTRACT

The device for mounting and removing blanket strips of a rotary cutting anvil cylinder comprises means for tightening and loosening the ends of at least one blanket strip so as to allow permutation with the other blanket strips of the rotary cutting anvil cylinder. The means for tightening and loosening the ends of a blanket strip include a locking and unlocking element placed in a groove in the periphery of the cylinder body of the rotarycutting anvil cylinder, the groove extending over the entire axial width of the cylinder body. The locking and unlocking element comprises a removable slide moving in the groove. the repective slide includes angled guiding grooves and also grooves all in the shape of linear cams into which fit rollers fixedly attached to at least one jaw which is moveable so as to act on at least one end of the blanket strips. The moveable slide is actuated by atraction device which comprises an adjusting screw fitting into a nut attached to the moveable slide.

8 Claims, 8 Drawing Sheets

DEVICE FOR MOUNTING AND REMOVING DIE BLANKETS OF A ROTARY CUTTING ANVIL CYLINDER

BACKGROUND OF THE INVENTION

The present invention relates to a device for mounting and removing die blankets of a rotary cutting anvil cylinder. The rotary die-cutting operation of the cardboard or corrugated cardboard is well-known and utilizes inter alia, on the one hand, a tool holder cylinder generally consisting of a metal cylinder body on which shells are fixed, preferably made of wood, in which metal cutting rules are inserted and, on the other hand, a cutting anvil cylinder commonly called anvil. This anvil cylinder consists of a metal cylinder body on which blanket strips are mounted, generally made of a plastic such as polyurethane for example.

The tool holder cylinder can be covered by various shells having cutting rule configurations according to the shapes and dimensions of the boxes to be cut. The matter to be cut, in this case corrugated cardboard, passes between the tool holder cylinder and the cutting anvil cylinder and, at the time of the die-cutting operation, the metal rules of the tool holder cylinder penetrate more or less deeply into the blanket strips, which causes after a certain number of hours of cutting a wear of some of these blanket strips.

The blanket strips are generally mounted side by side over the width of the cylinder body of the anvil cylinder. The cylinder body has a groove extending over its entire width. In order to fix the blanket strips, the ends of them are inserted in the groove arranged in the anvil cylinder by means of a mallet. Each end of the blanket strips can be reinforced by a metal reinforcement, one end having a centering nose and the other a notch into which fits the centering nose. Due to this fixing, the mounting thus carried out is practically permanent and requires a removal by force.

The wear of the surface of the blanket strips is not regular over the entire width of the anvil cylinder and, obviously, if the wear interferes with the diecutting or creasing operation of the cardboard, an acceptable surface quality of the die blanket of the anvil cylinder should be restored.

Generally, to restore the surface quality, the external diameter of the die blanket of the anvil cylinder is rectified by grinding or any other similar machining. Due to the high production rate of the rotary die-cutting machines, this operation must be frequently repeated and, in addition to causing an important reduction in the productivity of the machine, it involves a significant consumption of blanket strips.

SUMMARY OF THE INVENTION

The aim of the present invention is to eliminate the aforesaid disadvantages with an anvil cylinder whose design allows to make the restoration operations less frequently, or even to remove them.

To this end, the present invention relates to a device for quickly mounting and removing blanket strips of a rotary cutting anvil cylinder characterized in that it comprises means for tightening and loosening the ends of at least one blanket strip so as to allow permutation with the other blanket strips of the anvil cylinder before a significant wear arises.

According to an embodiment of the invention, the means for tightening and loosening the ends of a blanket strip consist of a locking and unlocking element placed in a groove arranged in the periphery of the cylinder body of the rotary cutting anvil cylinder, this groove extending over the entire width of the cylinder body.

According to a preferred embodiment of the invention, the locking and unlocking element comprises a removable slide moving in the groove extending across the cylinder body, this removable slide including guiding grooves and grooves in the shape of linear cams into which fit rollers fixedly attached to at least one jaw which is removable so as to act on at least one end of the blanket strips.

According to another embodiment of the invention, the removable slide is actuated by means of a traction device comprising an adjusting screw fitting into a nut attached to the lower part of the removable slide.

According to another preferred embodiment of the invention, the traction device comprises a cylinder for actuating the removable slide. According to an embodiment of the invention, the traction device is placed in a groove arranged at one end of the cylinder body.

BRIEF DESCRIPTION OF THE DRAWINGS

The accompanying drawings illustrate, schematically and by way of example, an embodiment of the device for mounting and removing blanket strips of a rotary cutting anvil cylinder being subject of the invention.

DESCRIPTION OF PREFERRED EMBODIMENTS

Figure 1:
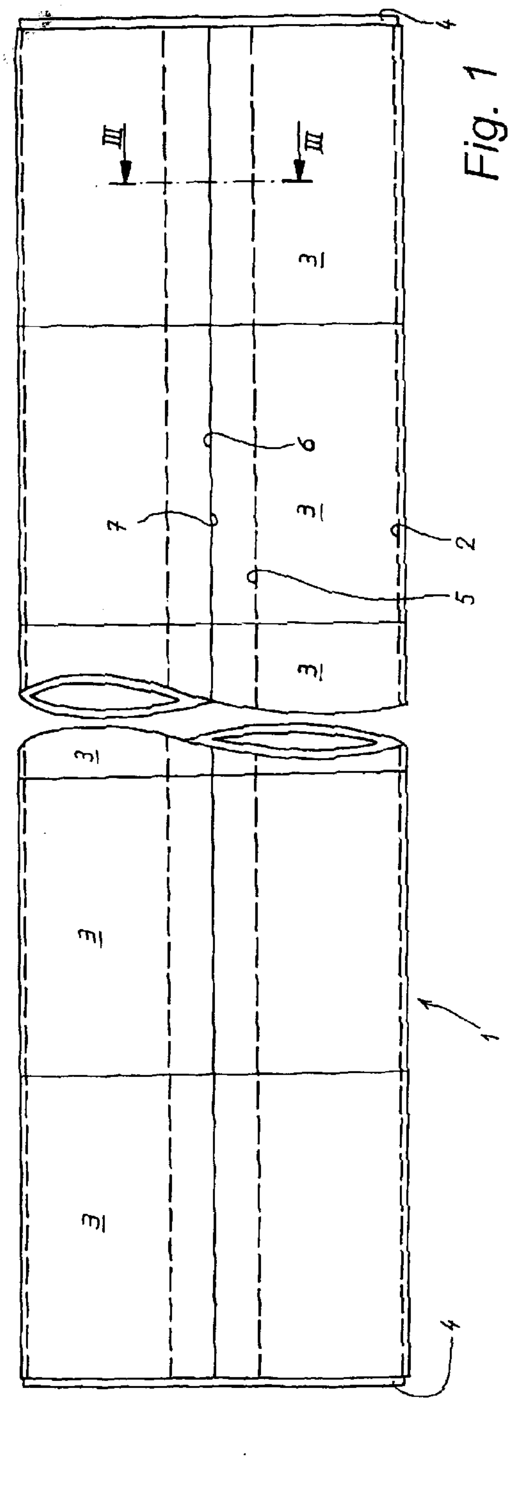
FIG. 1 is a schematic view of a rotary cutting anvil cylinder.

FIG. 1 is a schematic view of a rotary cutting anvil cylinder comprising a cylinder body 2 on which are rolled up blanket strips 3 kept at each end of the cylinder body 2 by means of stop discs 4. The cylinder body 2 comprises a groove 5 extending over its entire axial direction. The ends 6, 7 of the blanket strips 3 fit into a tightening and loosening means consisting of a locking and unlocking device 8 (see FIGS. 3, 4 and 5) placed in the groove 5.

Figure 2:
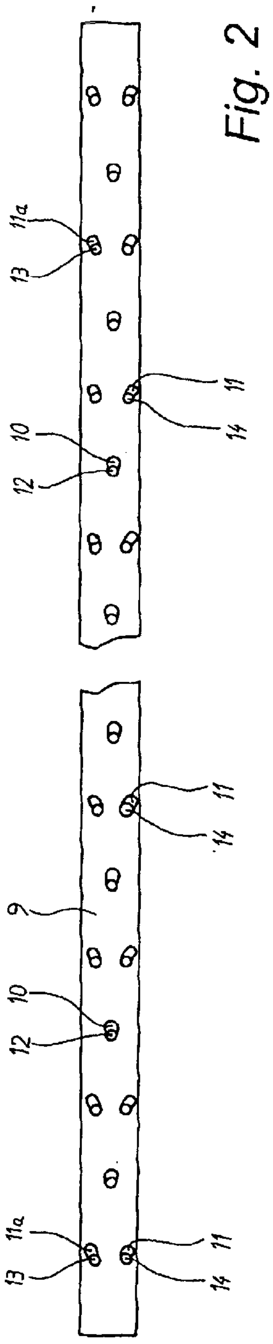
FIG. 2 is a plan view of a removable slide.

FIG. 2 is a plan view of a removable slide 9 used in the locking and unlocking device 8. This removable slide 9 comprises guiding grooves 10 and grooves in the shape of linear cams 11 into which fit rollers 12, 13 and 14 (see FIGS. 3 to 6.

Figure 3:
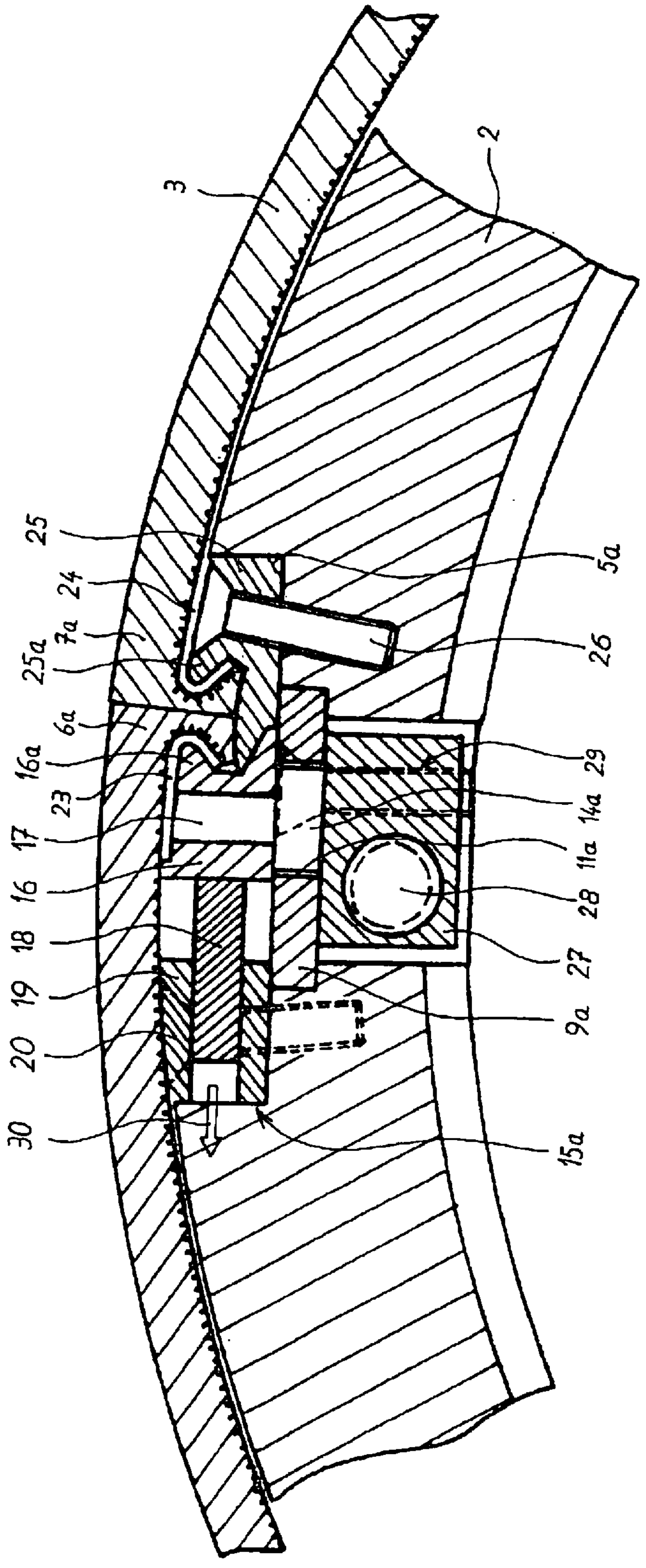
FIG. 3 is a view in partial section according to III—III of FIG. 1 illustrating a locking and unlocking device with only one jaw in tightening position of the blanket strips.

FIG. 3 is a view in partial section according to III—III of FIG. 1 illustrating a locking and unlocking device 8, with only one jaw 16, in tightening position of the blanket strips 3. The locking and unlocking device 8 comprises a removable slide 9*a* which includes grooves in the shape of linear cams 11*a* into which fit the rollers 14*a*. The rollers 14*a* are mounted on an axis 17 fixedly attached to the jaw 16. This jaw 16 is provided with guiding rods 18 which can slide in a small bar 19 kept in the groove 5*a* by means of screws 20. The end 6*a* of the blanket strip 3 hangs on the nose 16a of the jaw 16. The other end 7*a* of the blanket strip 3 is hung on the nose 25*a* of a fixed small bar 25 kept in the groove 5*a* by means of screws 26. The ends of the strips, depending on manufacture, can be reinforced by stiffeners 23 and 24. The removable slide 9*a* includes at one end a traction device consisting of a nut 27 crossed by an adjusting screw 28. This nut 27 is attached to the lower part of the removable slide 9*a* by means of screws 29.

Thus, when actuating the adjusting screw 28 of the removable slide 9*a* in one direction, the jaw 16 will move in the direction of arrow 30 in order to loose the end 6*a* of the blanket strip 3. This displacement of the jaw 16 is obtained through action of the grooves 11*a* in the shape of linear cams, arranged in the removable slide 9*a* on the rollers 14*a*, fixedly attached to the jaw 16. The displacement of the jaw 16 will be chosen so that the end 6*a* of the blanket strip 3 can be released from the nose 16*a* and this blanket strip easily and without wear removed. By turning the adjusting screw 28 in the opposite direction, after having replaced either a blanket strip 3 to be permuted, or a new blanket strip 3, the jaw will move in the opposite direction of arrow 30 what will tighten the end 6*a* of the blanket strip 3 against its end 7*a*.

It is to be noted that this removable slide 9*a* includes grooves in the shape of linear cams 11*a* on only one part of its surface since only one jaw 16 exists. An unspecified number of locking and unlocking devices 8 are possible in the width, independent of the number of blanket strips 3 distributed over the width of the cylinder body 2.

Figure 4:
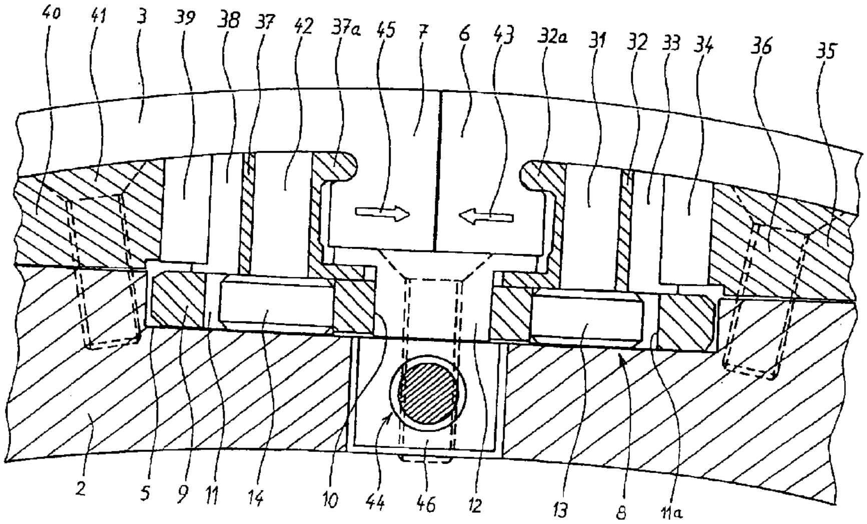
FIG. 4 is a view in partial section according to III—III of FIG. 1 illustrating a locking and unlocking device with two jaws in tightening position of the blanket strips.

FIG. 4 is a view in partial section according to III—III of FIG. 1 representing a locking and unlocking device 8 with two jaws in tightening position of the blanket strips 3. The locking and unlocking device 8 comprises a removable slide 9 which includes grooves in the shape of linear cams 11*a* into which fit rollers 13 and 14 (see also FIG. 2). The rollers 13 are mounted on an axis 31 driven in the jaw 32. This jaw 32 includes a profile in the shape of a toothing 33 acting jointly with a combined profile 34 arranged in the fixed small bar 35 kept in the groove 5 of the cylinder body 2 by means of screws 36. The function of these profiles 33, 34 is to always support the blanket strip 3 if a cutting rule faces the part of circumference corresponding to the zone between the rear of the jaw 32 and the front of the small fixed bar 35. Obviously, if a rectilinear rear part of the jaw 32 and a rectilinear front part of the small fixed bar 35 is chosen, a slit would be created when tightening at the level of which the blanket strip 3 would not be supported. The end 6 of the blanket strip 3 can be reinforced by a stiffener (not shown) and hangs on the nose 32*a* of the jaw 32. The other end 7 of the blanket strip 3 can also be reinforced by a stiffener (not shown) and hangs on the nose 37*a* of a second jaw 37. The jaw 37 also includes a profile in the shape of a toothing 38 acting jointly with a combined profile in the shape of a toothing 39 arranged in the small fixed bar 40 kept in the groove 5 of the cylinder body 2 by means of screws 41. The toothings 38 and 39 have the same function as the toothings 33 and 34. The rollers 14, associated with the jaw 37, fit into the grooves in the shape of linear cams 11 and are mounted on an axis 42 kept in the jaw 37.

Figure 6:
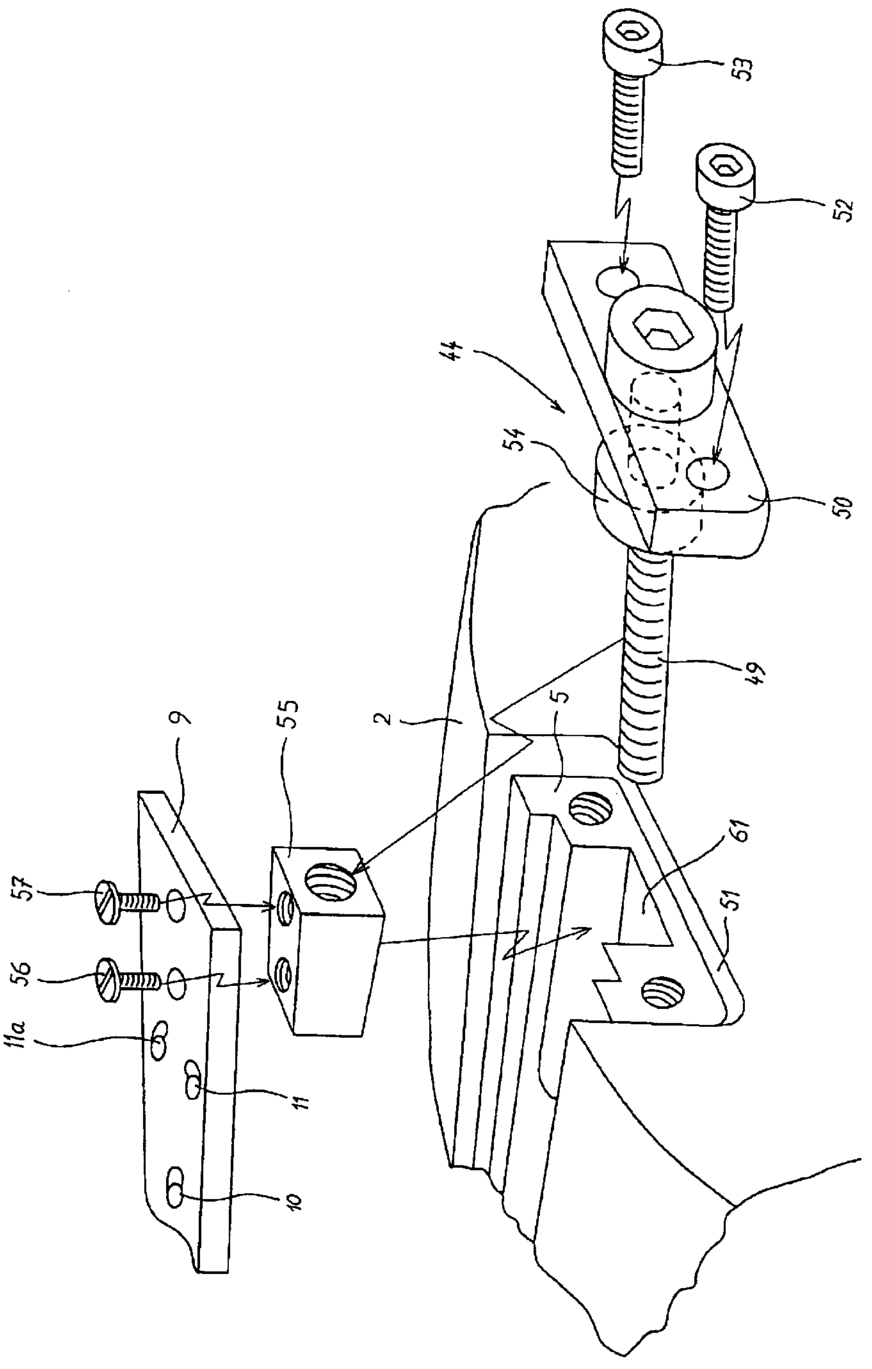
FIG. 6 is a perspective view of a traction device.

The removable slide 9 includes at one end a traction device 44 which will be described more in detail by means of FIGS. 6 and 7. When actuating the traction device 44, the jaw 32 moves in the direction of arrow 43 in order to tighten the end 6 of the blanket strip 3. This displacement of the jaw 32 is obtained through action of the grooves in the shape of linear cams 11*a*, arranged in the removable slide 5, on the rollers 13, fixedly attached to the jaw 32. The movement of the removable slide 9 will also simultaneously move the jaw 37 but in the direction of arrow 45, this by action of the grooves in the shape of linear cams 11 on the rollers 14. The jaws 32 and 37 as well as the removable slide 9 are guided by means of rollers 12 fitting into the guiding grooves 10. The rollers 12 are mounted, so as to be turnable, on the cylinder body 2 by means of screws 46.

The solution with two jaws 32 and 37 allows to loose and tighten the ends 6 and 7 of the blanket strips 3 by shortening the displacement of the removable slide 9 as well as of the jaws 32 and 37. An unspecified number of locking and unlocking devices 8 in the width are possible, independent of the number of blanket strips 3 distributed over the width of the cylinder body 2.

Figure 5:
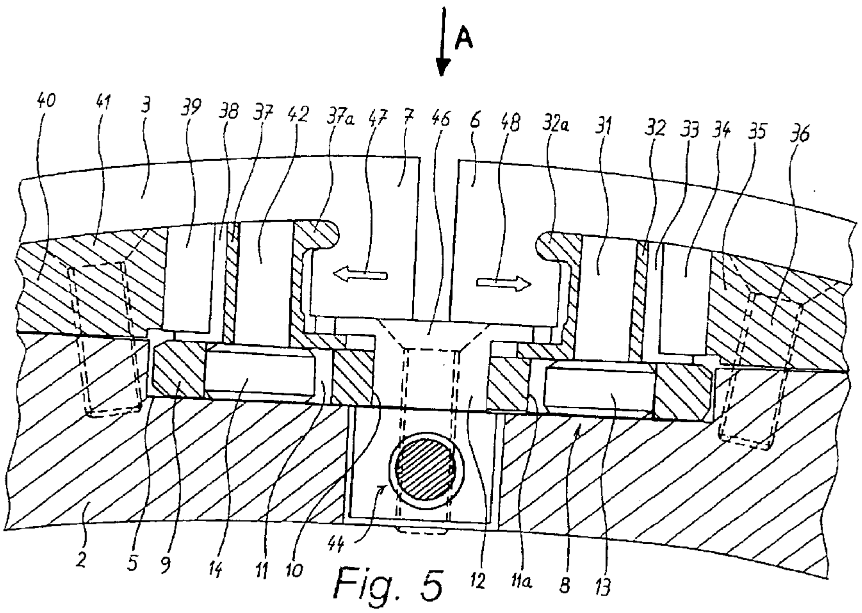
FIG. 5 is a view in partial section according to III—III of FIG. 1 illustrating the locking and unlocking device with two jaws in loosening position of the blanket strips.

FIG. 5 is a view in partial section according to III—III of FIG. 1 illustrating the locking and unlocking device 8 with two jaws in loosening position of the blanket strips. In this figure, the reference numerals are the same as those used in relation to FIG. 4. However, when actuating the traction device 44 in the opposite direction, the jaw 32 will move in the direction of arrow 47 in order to loosen the end 6 of the blanket strip 3. The movement of the removable slide 9 will also simultaneously move the jaw 37 in order to loosen the end 7 of the blanket strip 3 but in the direction shown by arrow 48, this by action of the grooves in the shape of linear cams 11 on the rollers 14. The displacement of the jaws 32 and 37 will be chosen so that the ends 6 and 7 of the blanket strip 3 can be released from the noses 32*a* and 37*a* and this blanket strip 3 easily and without wear removed.

This solution with two jaws 32 and 37 allows to tighten and loose the ends 6 and 7 of the blanket strips 3 by shortening the displacement of the removable slide 9 as well as of the jaws 32 and 37. An unspecified number of locking and unlocking devices 8 in the width are possible, independent of the number of blanket strips 3 distributed over the width of the cylinder body 2.

Figure 6A:
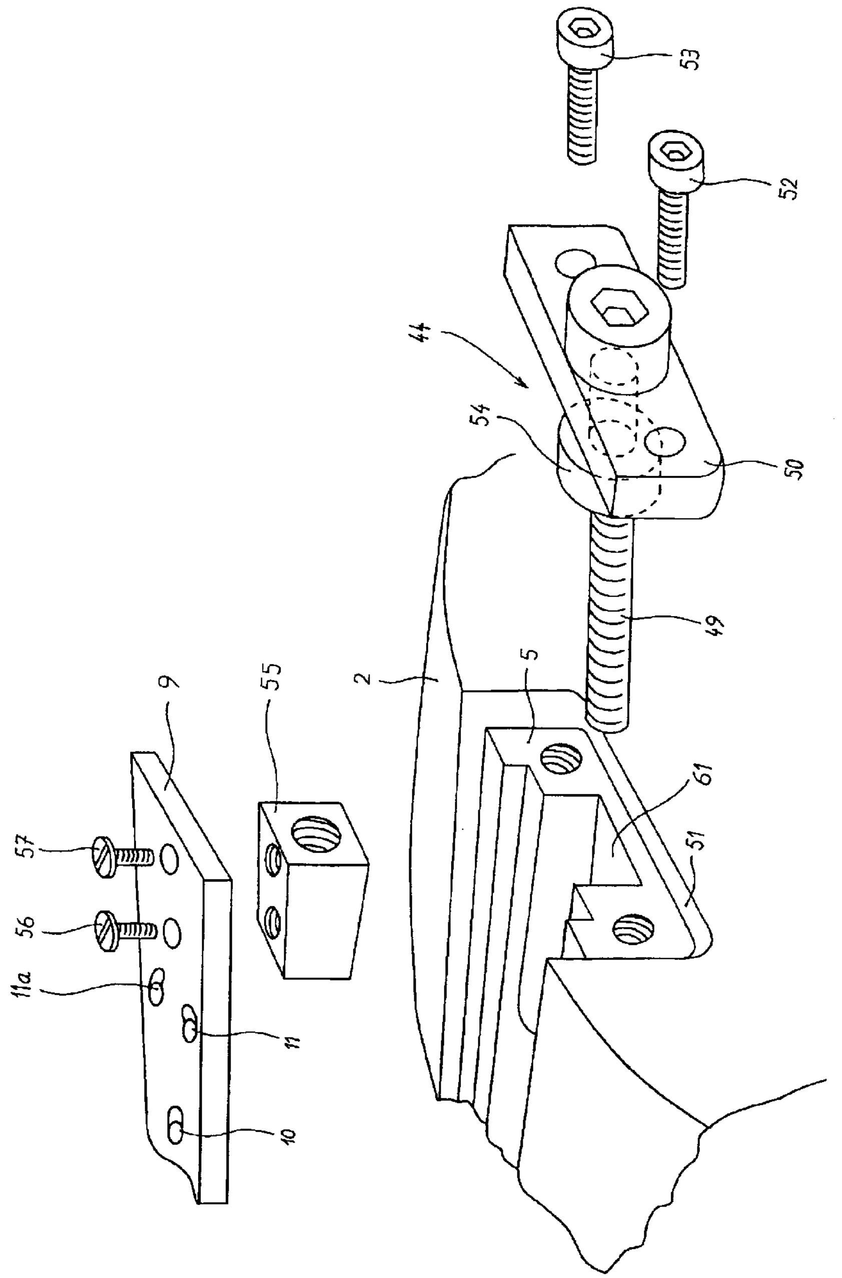
FIG. 6*a* is a perspective view of one embodiment of a traction device.
Figure 6B:
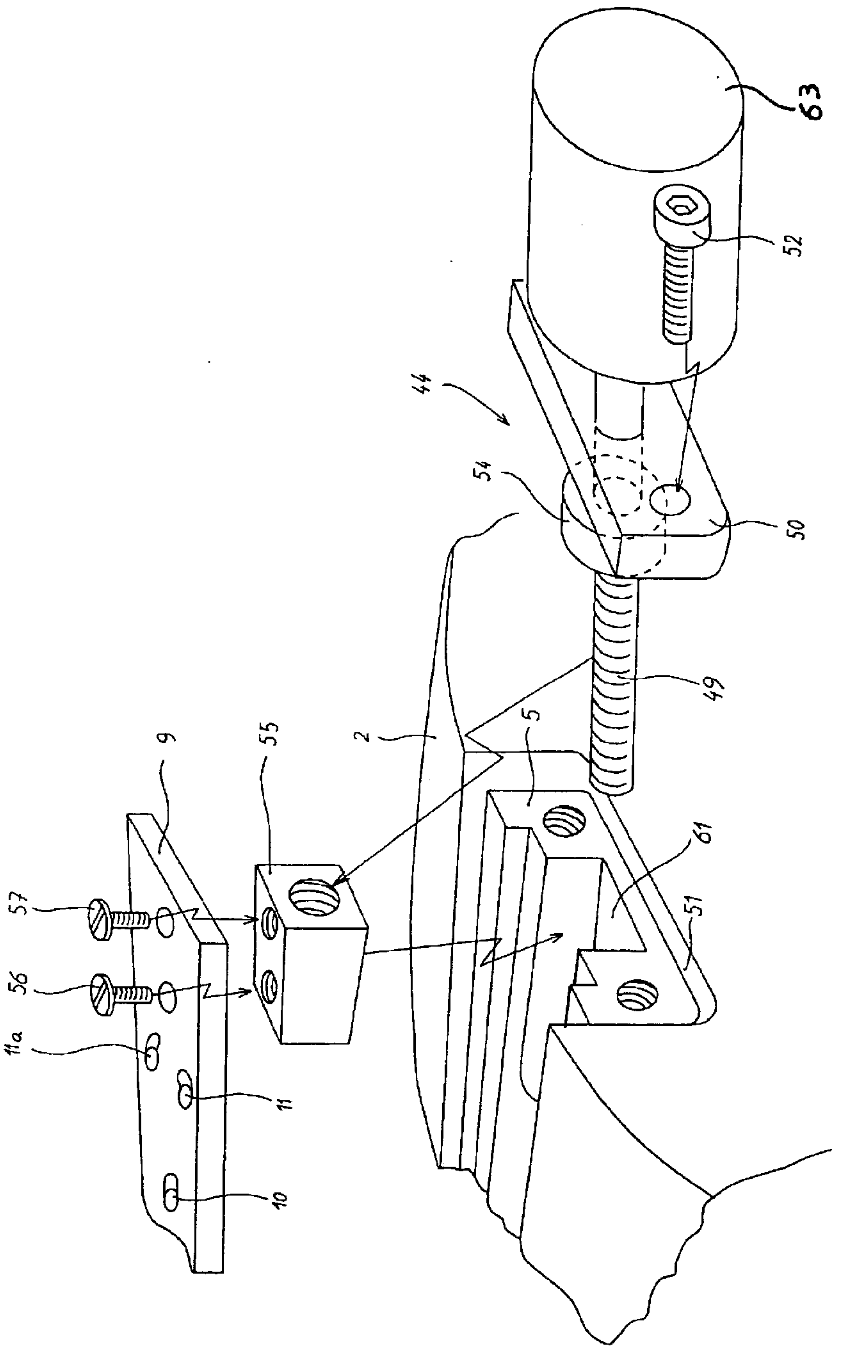
FIG. 6*b* is a perspective view of an alternate embodiment of a fraction device.

FIG. 6*a* is an exploded view, in partial section, of a traction device 44 arranged at one end of the rotary cutting anvil cylinder 1. This traction device 44 comprises an adjusting screw 49 guided in a bearing plate 50 fixed in a housing 51 of the rotary cutting anvil cylinder 1 by means of screws 52 and 53. This adjusting screw 49 is positioned in the bearing plate 50 by means of a set collar 54. The adjusting screw 49 fits into a nut 55 attached to the lower part of the removable slide 9 by screws 56 and 57. The nut being fitted in a recess 61. Thus, by rotating the adjusting screw 49 in one direction or the other, the ends 6, 7 of the blanket strips 3 are tightened or loosened. Obviously, the traction device 44 can be replaced by any other element able to move the removable slide 9, e.g. a pneumatic cylinder 63, shown in FIG. 6*b*. FIG. 6*b* is otherwise the same as FIG. 6*a* and the same reference numerals are used.

Figure 7:
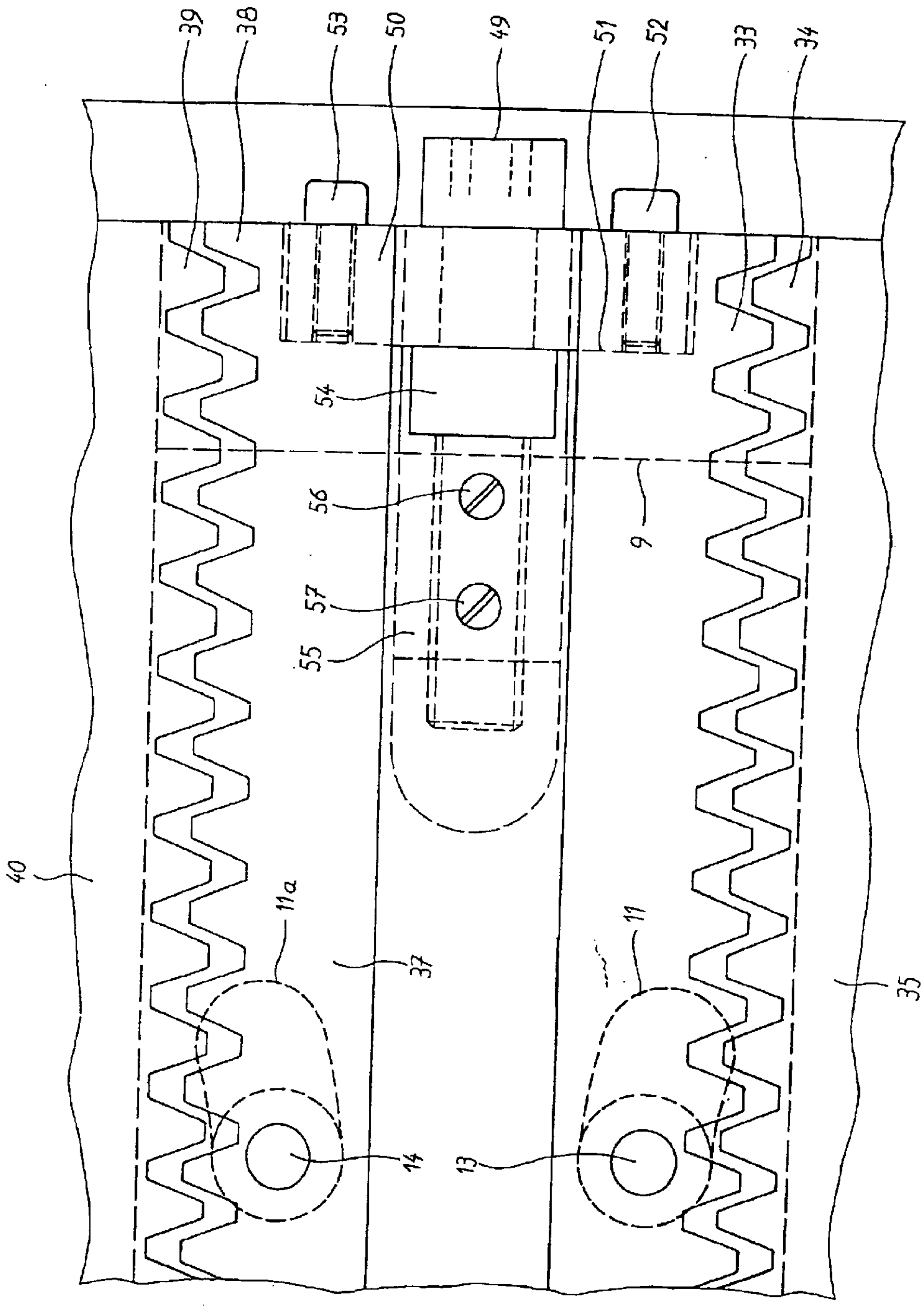
FIG. 7 is a view according to A of FIG. 5.

FIG. 7 is a view in the direction A of FIG. 5 represented without blanket strips 3. In this figure, the various components have the same reference numerals as those used in relation to the description of FIGS. 4, 5, 6*a* and 6*b*.

Figure 8A:
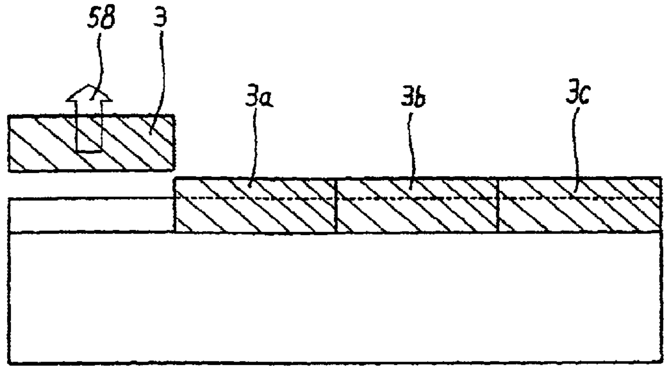
FIGS. 8*a* to 8*d* schematically illustrate the permutation sequences of the blanket strips.
Figure 8B:
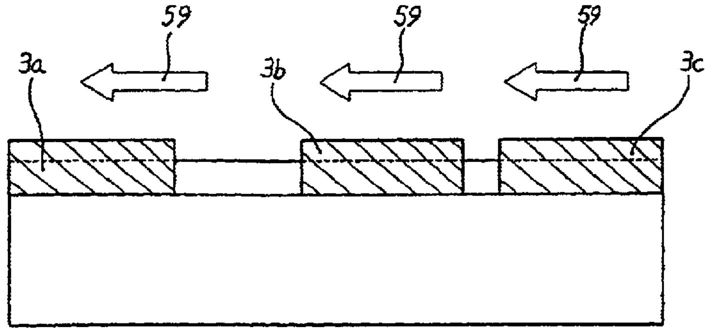
Figure 8C:
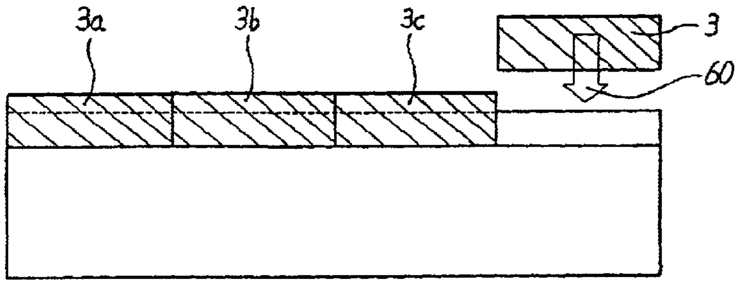
Figure 8D:
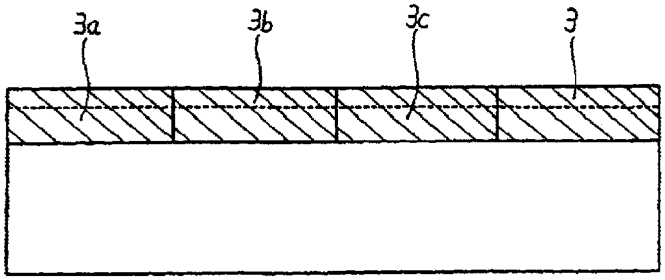

FIGS. 8*a* to 8*d* schematically illustrate the permutation sequences of the blanket strips 3. In FIG. 8*a*, the jaws 32 and

37 are in loosened position (see FIG. 5). It is thus possible to remove the blanket strip 3 as shown by arrow 58. The blanket strips 3*a* to 3*c* are also in a loosened position which allows them to move in the direction of arrows 59 (see FIG. 8*b*). Once the blanket strips 3*a* to 3*b* are displaced, the blanket strip 3 can be repositioned, as shown by arrow 60, at the place previously occupied by the blanket strip 3*c* (see FIG. 8*c*). The blanket strips 3 to 3*c* having been permuted, the traction device 44 will be acted and the jaws 32 and 37 will come into the tightening position as shown in FIG. 4. Obviously, this solution offers many possibilities to the user who can choose to permute any blanket strip 3 to 3*c* according to their wear without damaging the blanket strips 3 to 3*c*. The identical symmetrical shape of the ends of the strips 3 moreover allows to rotate themselves, the front edge becoming then the rear edge, for better distributing the wear.

What is claimed:

1. A device for mounting and removing blanket strips on a rotary cylinder, wherein the blanket strips have ends and the blanket strips are wrapped around the cylinder;

a first holding device on the cylinder for holding a first one of the ends of the blanket strip;

a second holding device on the cylinder for holding a second one of the ends of the blanket strip; and a device on at least one of the first and second holding devices for tightening and loosening the respective end of the blanket strip at the at least one of the holding devices;

wherein the cylinder has a periphery; the first and second holding devices comprise a groove in the periphery of the cylinder extending along the axial width of the cylinder for holding the blanket strips on the cylinder;

the device for tightening and loosening the ends of at least one of the blanket strips comprises a locking and unlocking element in the groove in the periphery of the cylinder;

wherein the locking and unlocking element comprises a slide disposed in the groove to be moved in opposite directions along the groove;

the tightening and loosening device comprising:

linearly extending camming grooves in the slide and angled with respect to the movement of the slide in the groove;

respective guide rollers disposed in the camming grooves; and a jaw to which each of the rollers is attached for moving the jaw in a direction across the groove when the slide moves along the groove to move the camming grooves, the jaw being part of the first holding device for the blanket strip, such that movement of the jaw which is caused by movement of the slide acts on at least one end of the blanket strip for selectively tightening and loosening the blanket strip.

2. The device of claim 1, further comprising cooperating guide elements on the slide and in the groove for guiding and controlling the movement of the slide in the grove.

3. The device of claim 2, wherein the guiding elements comprise guide grooves extending in the slide along the direction of the movement of the slide, and rollers on the cylinder engaging in the guide grooves for guiding and controlling the movement of the slide.

4. The device of claim 2, further comprising a traction device connected with the slide and operable for moving the slide along the groove.

5. The device of claim 4, wherein the traction device comprises a screw receiving nut attached to the slide and comprises an adjusting screw held stationary in position on the cylinder, in engagement with the nut on the slide, and rotatable for moving the nut and the slide along the groove.

6. The device of claim 5, further comprising the cylinder including a body with an end and a groove defined in the end of the cylinder; and the traction device being disposed in the end groove of the cylinder.

7. The device of claim 4, wherein the traction device comprises a cylinder connected with the slide for moving the slide along the groove.

8. The device of claim 1, further comprising a plurality of the tightening and loosening devices along the axial width of the cylinder, and each of the first and second holding devices including a respective jaw;

the jaws of the first and second holding devices having respective ones of the guide rollers thereon and the slide having respective angled camming grooves for each of the guide rollers for each of the first and second holding devices.

* * * * *